(12) United States Patent
Schlansker et al.

(10) Patent No.: US 8,364,874 B1
(45) Date of Patent: Jan. 29, 2013

(54) PRIORITIZED POLLING FOR VIRTUAL NETWORK INTERFACES

(75) Inventors: Michael Steven Schlansker, Los Altos, CA (US); Jean-Francois Collard, Sunnyvale, CA (US); Rajendra Kumar, Los Altos, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1636 days.

(21) Appl. No.: 11/332,956

(22) Filed: Jan. 17, 2006

(51) Int. Cl.
*G06F 13/00* (2006.01)
*G06F 13/36* (2006.01)

(52) U.S. Cl. ........................ 710/113; 710/107

(58) Field of Classification Search ............ 710/57, 710/111, 113, 116, 119–120, 123, 240–244; 709/220–221, 226; 718/1
See application file for complete search history.

(56) References Cited

U.S. PATENT DOCUMENTS

| | | | |
|---|---|---|---|
| 6,647,449 B1 * | 11/2003 | Watts | 710/111 |
| 2002/0120720 A1 * | 8/2002 | Moir | 709/220 |
| 2004/0179535 A1 * | 9/2004 | Bertagna | 370/395.21 |
| 2006/0206300 A1 * | 9/2006 | Garg et al. | 703/27 |
| 2006/0294518 A1 * | 12/2006 | Richmond et al. | 718/1 |
| 2007/0130352 A1 * | 6/2007 | Chhabra et al. | 709/230 |

* cited by examiner

*Primary Examiner* — Thomas J Cleary

(57) ABSTRACT

Methods and systems for prioritizing virtual network interface controllers (VNICs) are described. Each VNIC is assigned a priority level and a maximum current priority level associated with VNICs which are requesting service is determined. Fairness is enforced by using a round robin approach to selection among those currently requesting VNICs which have the same, maximum current priority level.

22 Claims, 4 Drawing Sheets

PRIORITIZED POLLING FOR VIRTUAL NETWORK INTERFACES

BACKGROUND

The present invention relates generally to data communication systems and methods and, more particularly, to data communication systems and methods in which a number of virtual network interfaces efficiently share hardware resources in, for example, Ethernet-based, scalable and tightly coupled systems.

Ethernet's broad use continues to stimulate dramatic increases in performance and decreases in cost for components commonly used in commercial applications. Many of today's commercial applications tolerate the relatively high latency associated with Ethernet-based systems, however emerging commercial applications, such as multithreaded databases and file systems, will likely require reduced latency. Some specialized network solutions provide reduced latency, but are more expensive than Ethernet-based scalable clusters.

One area in which latency performance can be improved is in the network interface controller (NIC). A NIC is a hardware device that supports communication with a network. As context, consider the exemplary system of FIG. 1. Therein a symmetric multiprocessor (SMP) system 10 includes a number of central processor units (CPUs) 12 which share memory unit 14 via coherence fabric 16. Although SMP 10 is shown as having four processor cores, those skilled in the art will appreciate that SMP 10 can have more or fewer CPUs. SMP 10 sends messages to other SMPs 20 under the control of NIC 18 via Ethernet connections and a fabric (switch) 22. The NIC 18 will typically have a processor (not shown) associated therewith, either as an integral part of the NIC or in the form of a helper processor, so that the NIC has sufficient intelligence to interpret various commands. The fabric 21 will route messages to their intended recipients, although occasionally messages will be dropped such that the system illustrated in FIG. 1 needs to support retransmission of dropped messages.

Although there is only one hardware NIC 18 per SMP 10, 20, many different software programs may be running simultaneously on a given SMP and may have messages to transmit across the system via fabric 21. Thus the NIC 18 needs to be implemented as a shared resource. One approach for sharing the NIC 18 is to require that, as part of the message transmission process, the various software programs call a complex operating system driver to coordinate shared access to the NIC 18. However, this shared access mechanism leads to high software overhead as a time consuming operating system call is required for frequently executed communication operations.

Another approach for sharing the NIC 18 employs virtual network interface controllers (VNICs) to provide a distinct interface for each of the multiple programs that share that NIC. A VNIC is a user-level software interface that is used, by a program, to communicate directly with a NIC. A VNIC can be implemented within a special region of a user's memory space where actions, such as the reading and writing of data, are used to direct the NIC to carry out communication operations. A special communication library can be provided to translate higher level communication operations, such as sending a message, into appropriate lower-level actions used to control the NIC.

As shown in FIG. 2, since a number of VNICs 22 operate to share one NIC 18, some priority mechanism 24 is needed to determine which VNIC shall receive service from a NIC among a set of competing service requests. In some systems, dynamic priority is important. In such cases, the priority of a VNIC can be dynamically raised or lowered in order to track changing service needs for that VNIC. Accordingly, exemplary embodiments of the present invention provide methods and systems to prioritize VNIC service requests.

SUMMARY

According to one exemplary embodiment of the present invention, a method for selecting a virtual network interface controller (VNIC) for servicing from among a plurality of VNICs includes the steps of assigning a priority level to each of said plurality of VNICs, determining a maximum priority level of at least one VNIC which is currently requesting service and selecting, on a round robin basis, one of the at least one VNICs to receive service.

According to another exemplary embodiment of the present invention, a system for selecting a virtual network interface controller (VNIC) for servicing from among a plurality of VNICs includes a plurality of VNICs, each having a priority level assigned thereto, a maximum priority function which determines a maximum priority level of at least one of the plurality of VNICs which are currently requesting service and a selection unit which selects, on a round robin basis, one of the at least one of the plurality of VNICs having the maximum priority level to receive service.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

Figure 1:
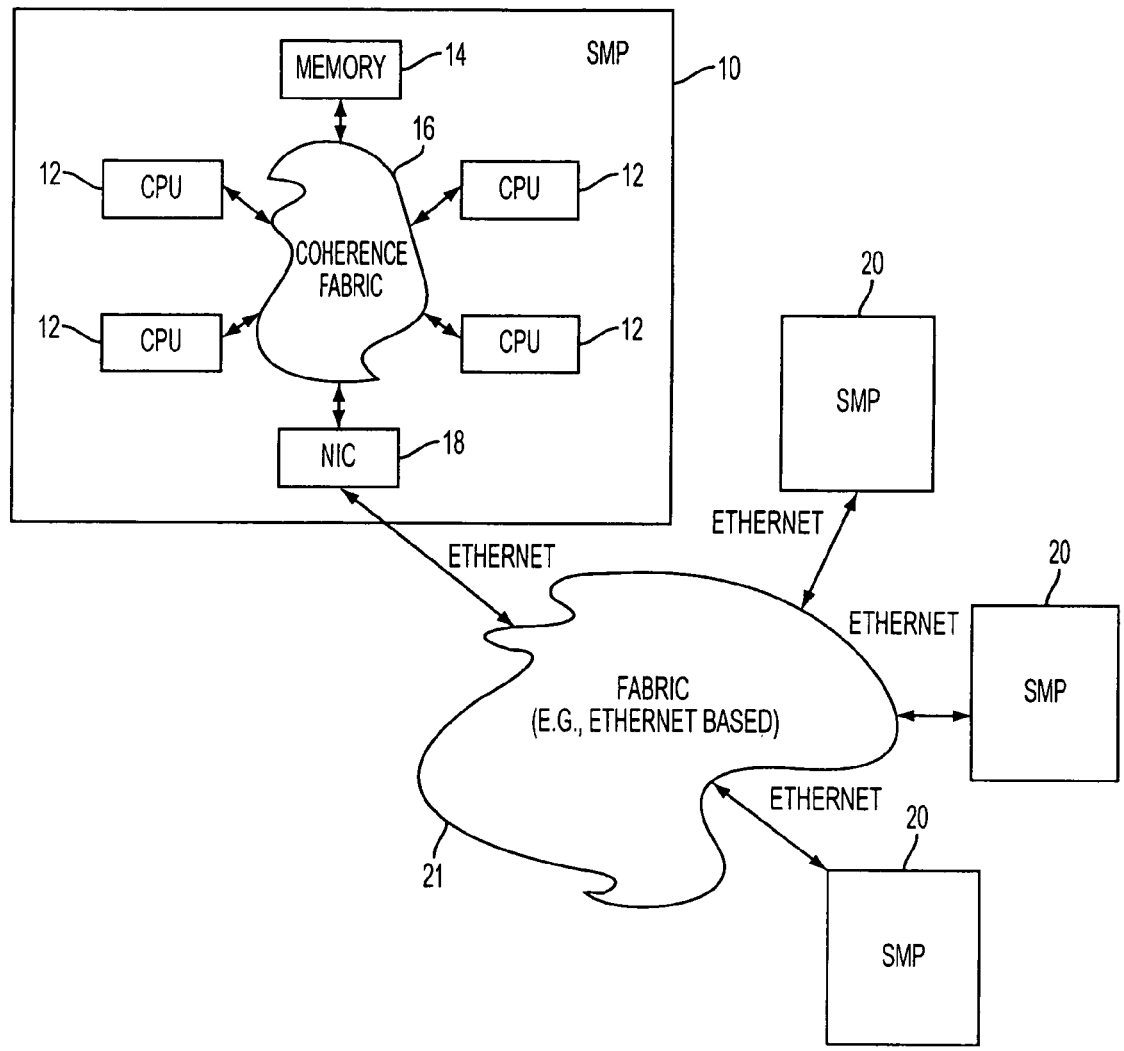
FIG. 1 illustrates an exemplary system in which exemplary embodiments of the present invention can be implemented
Figure 2:
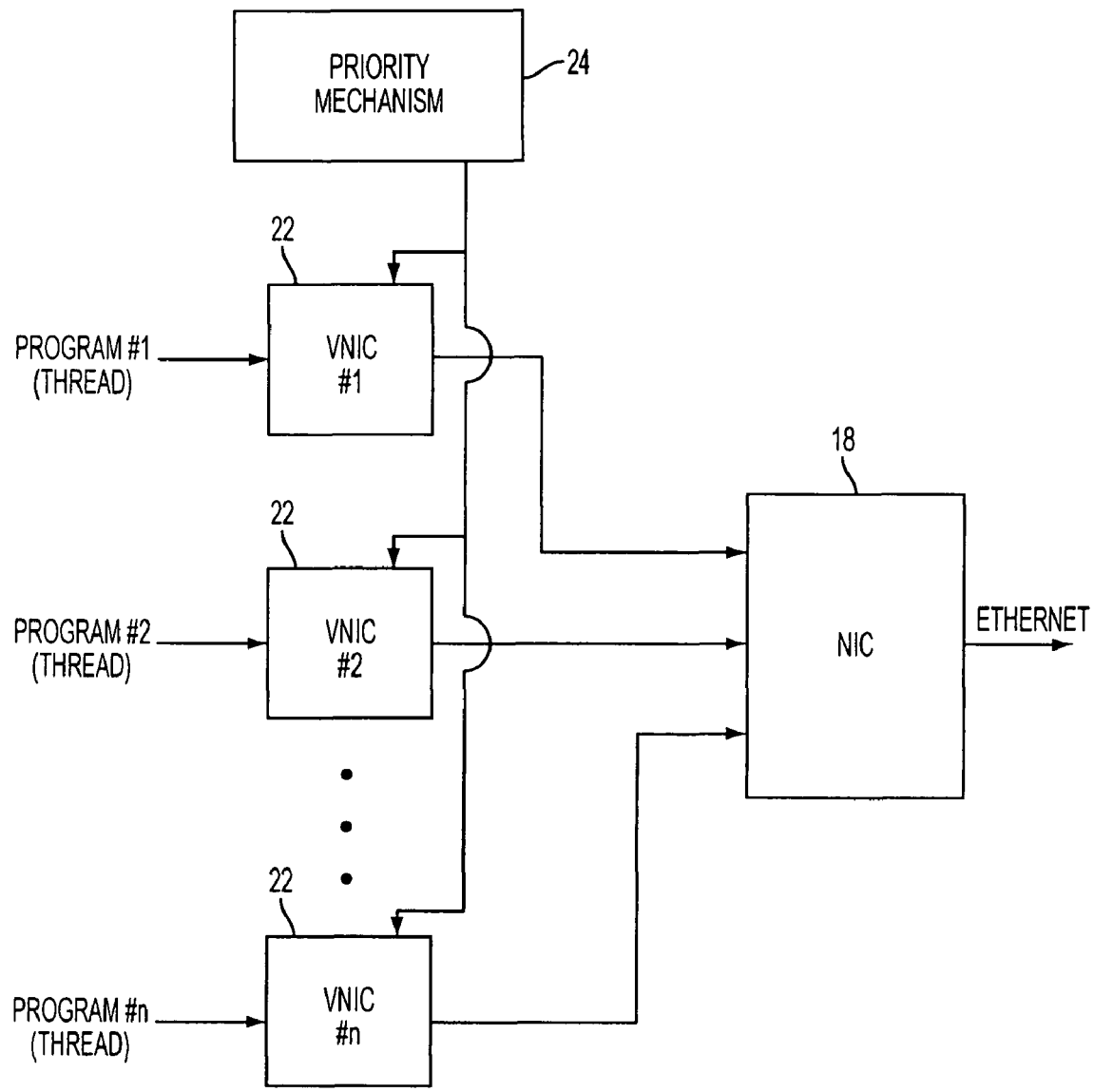
FIG. 2 depicts a priority mechanism for selecting a VNIC to be serviced by a NIC according to an exemplary embodiment of the present invention.

The following description of the exemplary embodiments of the present invention refers to the accompanying drawings. The same reference numbers in different drawings identify the same or similar elements. The following detailed description does not limit the invention. Instead, the scope of the invention is defined by the appended claims. Reference is made below to FIGS. 1 and 2 and elements described therein.

According to exemplary embodiments of the present invention, priority mechanism 24 and corresponding methods efficiently identify which one of the plurality of VNICs 22 should receive service at a given point in time. Determining which VNIC 22 receives service can be accomplished based on a number of factors. First, each VNIC 22 can be assigned a predetermined priority such that higher priority interfaces receive service before lower priority interfaces. Second, fair service should be provided for VNICs 22 having the same priority level. Third, exemplary priority mechanisms 24 should provide service as rapidly as possible, in accordance with priority and fairness, to reduce latency associated with sharing the NIC 18.

Figure 3:
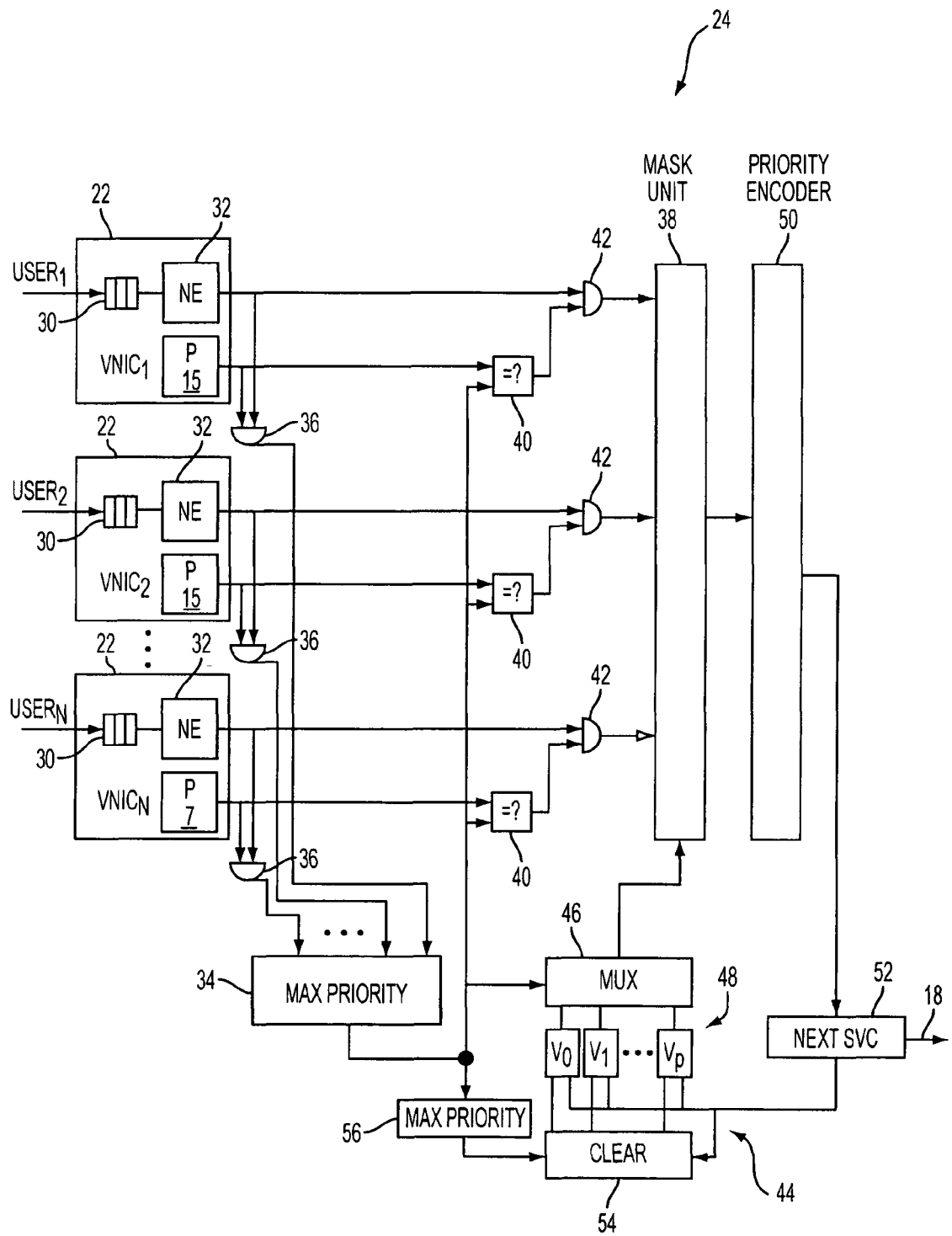
FIG. 3 illustrates a more detailed version of a priority mechanism according to an exemplary embodiment of the present invention.

These and other features are provided by priority mechanisms 24 in accordance with the present invention, an example of which is illustrated in FIG. 3. Therein, users (e.g., software applications which have each been assigned a separate VNIC 22) submit commands or requests to their respective VNIC 22 which can, for example, be stored in respective queues 30. According to one exemplary embodiment of the present invention, a pointer to the head of the queue 30 can be provided which enables the NIC 18 to access commands within each VNIC 22. Readers interested in more detail regarding head of the queue pointers are directed to U.S. patent application Ser. No. 11/326,919, entitled "Head of Queue Cache for Communication Interfaces", to Michael Schlansker et al., filed on Jan. 6, 2006, the disclosure of which is incorporated here by reference. The NIC 18 can include circuitry (not shown) that monitors a processor-to-memory interconnect for updates to each VNIC's head pointer. These head pointers can be provided at known memory address locations that are provided to the NIC when a VNIC 22 is defined/initialized. For example, a table of head pointer addresses within the NIC 18 can be used to identify the head pointer for each VNIC 22.

When software adds an entry to one of the VNIC queues 30, a corresponding not-empty (NE) bit 32 is updated. For example, if $VNIC_1$ has an empty queue 30 and receives a command from user1, then the corresponding NE bit 32 will be changed to indicate that the queue 30 now has a command to be processed. When the NIC 18 has completed processing a previous command, and is considering which VNIC 22 to select for servicing, according to this exemplary embodiment of the present invention priority mechanism 24 operates to determine a highest priority, non-empty VNIC 22 for service. This determination is made by MAX priority function 34 based on various inputs received from the VNICs 22. Each VNIC 22 which currently has a non-empty queue 30 sends its respective priority (P) to the MAX priority function 34. This process is illustrated by gating functions 36 in FIG. 3, whereby the priority value of each VNIC 22 is selectively passed on to MAX priority function 34 if and only if the corresponding NE bit 32 indicates that that VNIC 22 has a command pending for service in its queue 30.

Purely for illustration, in this example, $VNIC_1$ and $VNIC_2$ have been assigned priority level 15 and $VNIC_N$ has been assigned priority level 7. According to one exemplary embodiment of the present invention, VNICs 22 can be assigned any one of priority levels 0-15, although more or fewer priority levels are also contemplated by the present invention. Thus, assuming that all three of these VNICs 22 currently have commands to be serviced, MAX priority function 34 would receive priority levels 15, 15 and 7 from $VNIC_1$, $VNIC_2$ and $VNIC_N$, respectively. MAX priority function 34 operates to select and output the highest received priority level, effectively ignoring servicing requests from VNICs having lower priority levels. Thus, for this exemplary iteration of priority mechanism 24, MAX priority function 34 would output priority level 15 as the current, maximum priority level and ignore the request for service from $VNIC_N$.

The current, maximum priority level output from MAX priority function 34 is used for a number of different purposes in the priority mechanism 24 according to this exemplary embodiment of the present invention. For example, the current maximum priority level is used to selectively permit the empty/non-empty status of each VNIC 22 from reaching mask unit 38. This occurs by presenting the current maximum priority level to comparators 40, where it is compared with the priority level associated with a corresponding VNIC 22. If the current, maximum priority level is the same as the priority level of the corresponding VNIC 22, then the comparator 40 can, for example, output a "1" to a corresponding AND function 42, thereby enabling the empty/non-empty status of the corresponding VNIC 22 to reach mask unit 38. Alternatively, if the current, maximum priority level and the priority level of a corresponding VNIC 22 do not match, then the corresponding comparator 40 will output, for example, a "0" to a corresponding AND function 42, thereby preventing the empty/non-empty status of the corresponding VNIC 22 from reaching the mask unit 38 during this iteration. In the foregoing example, the empty/non-empty status of $VNIC_1$ and $VNIC_2$ will be passed to mask unit 38, since their respective priority levels match the current, maximum priority level (15) output by the MAX priority function 34.

The current, maximum priority level is also used as an input for the round robin function 44. According to these exemplary embodiments of the present invention, service fairness between VNICs 22 having a same priority level is implemented by servicing competing requests from such VNICs on a round robin basis using a virtual interface polling index $v_i$ for each priority level i. The virtual interface polling index identifies, for each priority level, the last VNIC 22 that was serviced by the priority mechanism 24. The current, maximum priority is used to select, via multiplexer (MUX) 46, the corresponding polling index $v_i$ 48 which stores the index of the VNIC that was last serviced within that priority level. Thus, in the continuing example used herein, the select input to MUX 46 would be a value corresponding to priority level 15, which would then pass the value stored in polling index $v_{15}$ to mask unit 38.

A round robin service approach dictates that a most recently service $VNIC\ V_i$ at a given priority level i should be considered last for future service at that priority level. A masking circuit provides a similar approach for fairness. Mask unit 38 uses the value received from MUX 46 to further screen empty/non-empty status information received from VNICs 22 by temporarily masking off requests from VNICs 22 having the same or a lower index than that received from MUX 46. Consider, for example, the situation where, during a previous iteration of priority mechanism 24, $VNIC_1$ was serviced and its index was stored in polling index $v_{15}$. Then, during the current iteration, mask unit 38 will receive VNIC index 1 from MUX 46, mask off $VNIC_1$'s current request for service and pass $VNIC_2$'s request for service on to priority encoder 50. Priority encoder 50 receives unmasked requests for service and selects one of those requests for service. In this exemplary embodiment of the present invention, the priority encoder 50 selects the VNIC 22 having the smallest unmasked index for service and passes that index on to block 52 where it is identified to NIC 18 for servicing. In the previous example, the priority encoder 50 only received $VNIC_2$'s index, since $VNIC_1$ was temporarily masked off by round robin circuit 44. If, however, priority encoder 50 had received both indices from the mask unit 38, then it would have selected index 1 as the smallest, unmasked index.

The index of the VNIC 22 selected for current service by priority encoder 50 is used to update the round robin circuit 44. For example, if $VNIC_2$ is selected for service during the current iteration, that index is passed back to round robin circuit 44 and stored in the corresponding polling index 48, i.e., in $v_{15}$ in this example. In that way, during a subsequent iteration of priority mechanism 24, mask unit 38 will operate to temporarily mask off requests from both $VNIC_1$ and $VNIC_2$ when service is again provided to priority level 15 requests.

After the priority mechanism 24 services the VNIC 22 having a greatest index value in a particular priority level, the round robin circuit 44 should be reset so that it no longer masks off any requests for service at that priority level. Consider, for example, the case where $VNIC_1$ and $VNIC_2$ are the only two VNICs assigned to priority level 15. After priority mechanism 24 services $VNIC_2$ (and stores its index in polling index register $v_{15}$), the next time that MAX priority function 34 identifies priority level 15 as the current maximum priority level, MUX 46 will provide index 2 to mask unit 38, thereby preventing any of the VNICs 22 having a level 15 priority from being serviced. The clear function 54 receives an indication from the next service block 52 that no VNIC was selected for service during this pass and clears the corresponding polling index $v_i$, using the value latched in block 56 to identify the polling index to be reset. This unmasks all of the VNICs at that priority level for servicing consideration during subsequent iterations.

Figure 4:
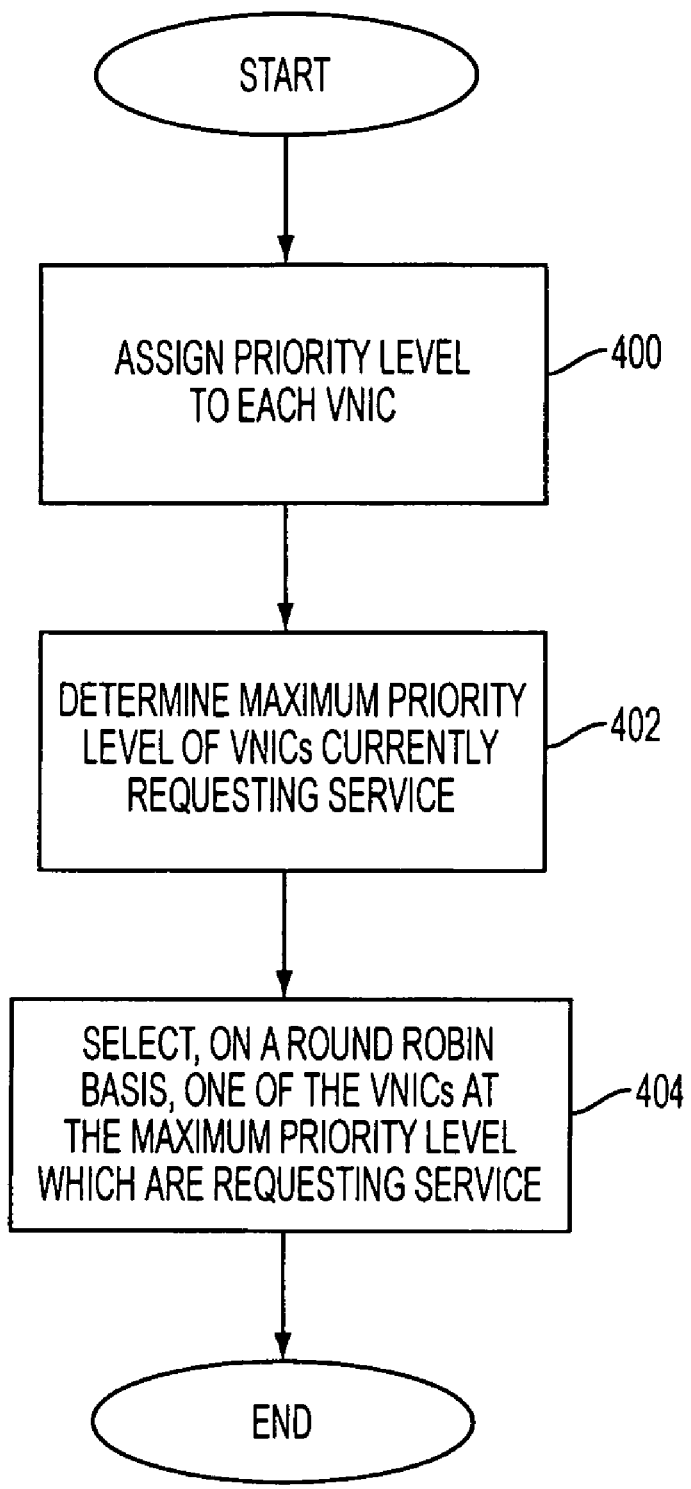
FIG. 4 is a flow chart depicting a method for selecting a VNIC for service according to an exemplary embodiment of the present invention.

After a next VNIC 22 is identified for service at block 52, the selected interface is serviced by NIC 18 and a command is removed from the corresponding queue 30. The priority mechanism 24 repeats the process, e.g., after updating the status of NE bits 32 and the polling index from the previous iteration. Thus, a general method for selecting a virtual network interface circuit (VNIC) for servicing from among a plurality of VNICs in accordance with an exemplary embodiment of the present invention is illustrated in FIG. 4. Therein, the method includes the steps of assigning a priority level to each of a plurality of VNICs at step 400, determining a maximum priority level of at least one VNIC which is currently requesting service at step 402 and selecting, on a round robin basis, one of the at least one VNICs to receive service at step 404. The various priority levels which are assigned to VNICs 22 may be dynamically changed either by hardware or by software. This enables changing the priority associated to all requests within a given VNIC as the level of urgency of service of that VNIC varies.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The foregoing description of exemplary embodiments of the present invention provides illustration and description, but it is not intended to be exhaustive or to limit the invention to the precise form disclosed. For example, the present invention is not limited to systems involving Ethernet-based communications. Modifications and variations are possible in light of the above teachings or may be acquired from practice of the invention. The following claims and their equivalents define the scope of the invention.

The invention claimed is:

1. A method for selecting a virtual network interface controller (VNIC) for servicing from among a plurality of VNICs, the method comprising the steps of:
    assigning a priority level to each of said plurality of VNICs;
    identifying at least one VNIC having a maximum priority level from among those VNICs which are currently requesting service; and
    selecting, on a round robin basis, one of said at least one VNICs to receive service.

2. The method of claim 1, further comprising the step of:
    servicing, by a network interface controller (NIC) shared by said plurality of VNICs, said selected one of said at least one VNICs, by transmitting a command stored in a queue of said selected one of said at least one VNICs.

3. The method of claim 1, wherein said step of assigning a priority level to each of said plurality of VNICs is performed dynamically.

4. The method of claim 1, wherein said step of identifying at least one VNIC having a maximum priority level from among those VNICs which are currently requesting service further comprises the step of:
    determining said maximum priority level of VNICs having commands to send via a network interface controller (NIC) by checking empty/not empty bits associated with each of said VNICs.

5. The method of claim 1, wherein said step of selecting, on a round robin basis, one of said at least one VNICs to receive service further comprises the step of:
    denying service to at least one VNIC having said maximum priority level which was provided with service during a previous selection step.

6. The method of claim 5, wherein said step of denying service further comprises the step of:
    providing, to a masking circuit, an index of a previously serviced VNIC stored in a polling index associated with said maximum priority level.

7. The method of claim 6, further comprising the step of:
    masking off VNICs having an index which is equal to or less than said index of said previously serviced VNIC stored in said polling index.

8. The method of claim 7, further comprising the step of:
    unmasking all VNICs associated with a same priority when a clear function receives an indication that no VNIC was selected for service during a most recent round robin iteration.

9. A system for selecting a virtual network interface controller (VNIC) for servicing from among a plurality of VNICs, the system comprising:
    a plurality of VNICs, each having a priority level assigned thereto;
    a maximum priority function which identifies at least one of said plurality of VNICs having a maximum priority level from among those VNICs which are currently requesting service; and
    a selection unit which selects, on a round robin basis, one of said at least one of said plurality of VNICs having said maximum priority level to receive service.

10. The system of claim 9, further comprising:
    a network interface controller (NIC), shared by said plurality of VNICs, said NIC servicing said selected one of said at least one of said plurality of VNICs, by transmitting a command stored in a queue of said selected one of said at least one VNICs.

11. The system of claim 9, wherein said priority levels are assigned to each of said plurality of VNICs dynamically.

12. The system of claim 9, further comprising empty/not empty bits associated with each of said VNICs which are checked to determine which of said plurality of VNICs to consider when identifying said maximum priority level.

13. The system of claim 9, wherein said selection unit denies service to at least one of said plurality of VNICs having said maximum priority level which was provided with service during a previous selection using said round robin basis.

14. The system of claim 13, further comprising:
a masking circuit which receives an index of a previously serviced VNIC stored in a polling index associated with said maximum priority level and selectively passes information associated with non-empty VNICs having said maximum priority level to said selection unit based on said index.

15. The system of claim 14, wherein said masking circuit masks off VNICs having an index which is equal to or less than said index of said previously serviced VNIC stored in said polling index.

16. A system comprising:
means for assigning a priority level to each of a plurality of virtual network interface controllers (VNICs);
means for identifying at least one VNIC having a maximum priority level from among those VNICs which are currently requesting service; and
means for selecting, on a round robin basis, one of said at least one VNICs to receive service.

17. The system of claim 16, further comprising:
means for servicing, by a network interface controller (NIC) shared by said plurality of VNICs, said selected one of said at least one VNICs, by transmitting a command stored in a queue of said selected one of said at least one VNICs.

18. The system of claim 16, wherein said means for assigning a priority level to each of said plurality of VNICs performs said assignment dynamically.

19. The system of claim 16, wherein said means for identifying further comprises the step of:
means for determining said maximum priority level of VNICs having commands to send via a network interface controller (NIC) by checking empty/not empty bits associated with each of said VNICs.

20. The system of claim 16, wherein said means for selecting, on a round robin basis, one of said at least one VNICs to receive service further comprises:
means for denying service to at least one VNIC having said maximum priority level which was provided with service during a previous selection step.

21. The system of claim 20, wherein said means for denying service further comprises:
means for providing, to a masking circuit, an index of a previously serviced VNIC stored in a polling index associated with said maximum priority level.

22. The system of claim 21, wherein said means for denying service further comprises:
means for masking off VNICs having an index which is equal to or less than said index of said previously serviced VNIC stored in said polling index.

* * * * *